United States Patent [19]

Nidiffer et al.

[11] Patent Number: 4,714,206
[45] Date of Patent: Dec. 22, 1987

[54] BAG-RECEIVING CHUTE FOR COFFEE GRINDER

[75] Inventors: Charles A. Nidiffer, Decatur; Raymond E. Van Camp, Rochester, both of Ill.

[73] Assignee: Bunn-O-Matic Corporation, Springfield, Ill.

[21] Appl. No.: 846,711

[22] Filed: Apr. 1, 1986

[51] Int. Cl.$^4$ ...................... B02C 19/00; B02C 23/00
[52] U.S. Cl. .................................... 241/100; 241/259; 141/10
[58] Field of Search ................... 241/100, 259; 99/304, 99/306; D7/373; 141/10

[56] References Cited

U.S. PATENT DOCUMENTS 2,290,747 7/1942 Henry .............................. 241/100 X Primary Examiner—Timothy V. Eley
Attorney, Agent, or Firm—Lockwood, Alex, FitzGibbon & Cummings

[57] ABSTRACT

A bag-receiving chute combination for a coffee grinder which has a downwardly facing discharge opening from which different sized batches of ground coffee discharge into bags of correspondingly different heights. The combination comprises an elongated, channel-shaped chute body adapted to be mounted underneath the grinder discharge opening so as to extend downwardly with sufficient spacing from the grinder body to permit insertion of the mouth of a bag around the chute. In addition there is a bag mouth spreader so shaped and mounted on the chute as to prevent a user from incorrectly mounting a bag under and around the chute.

8 Claims, 6 Drawing Figures

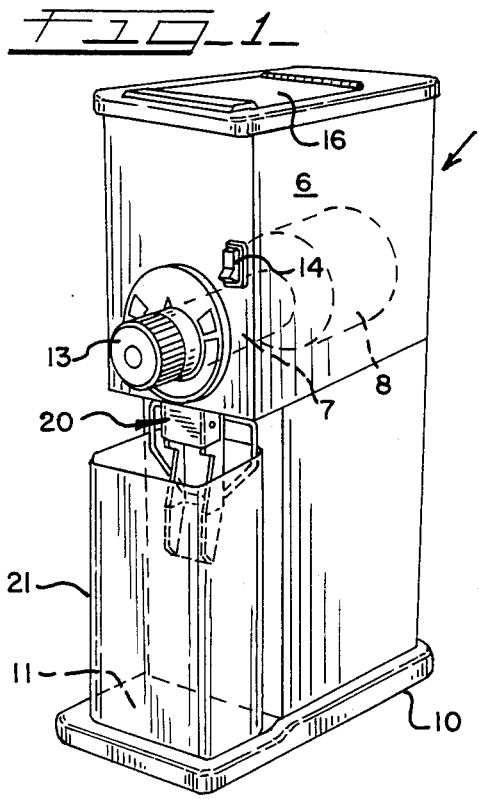
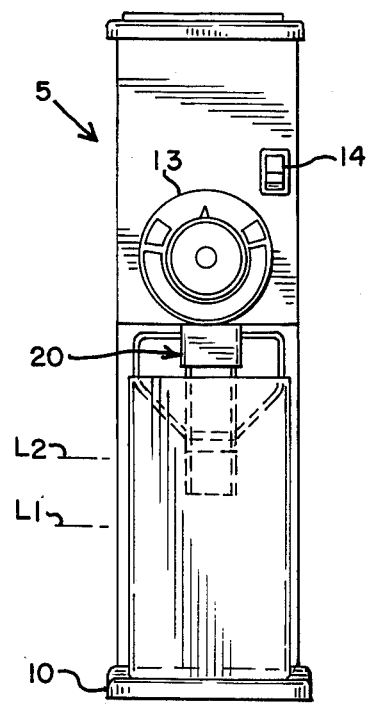
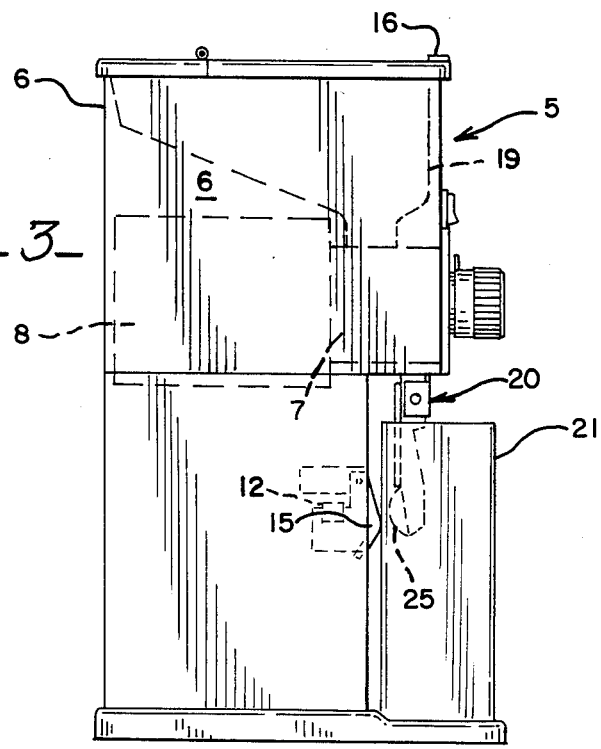

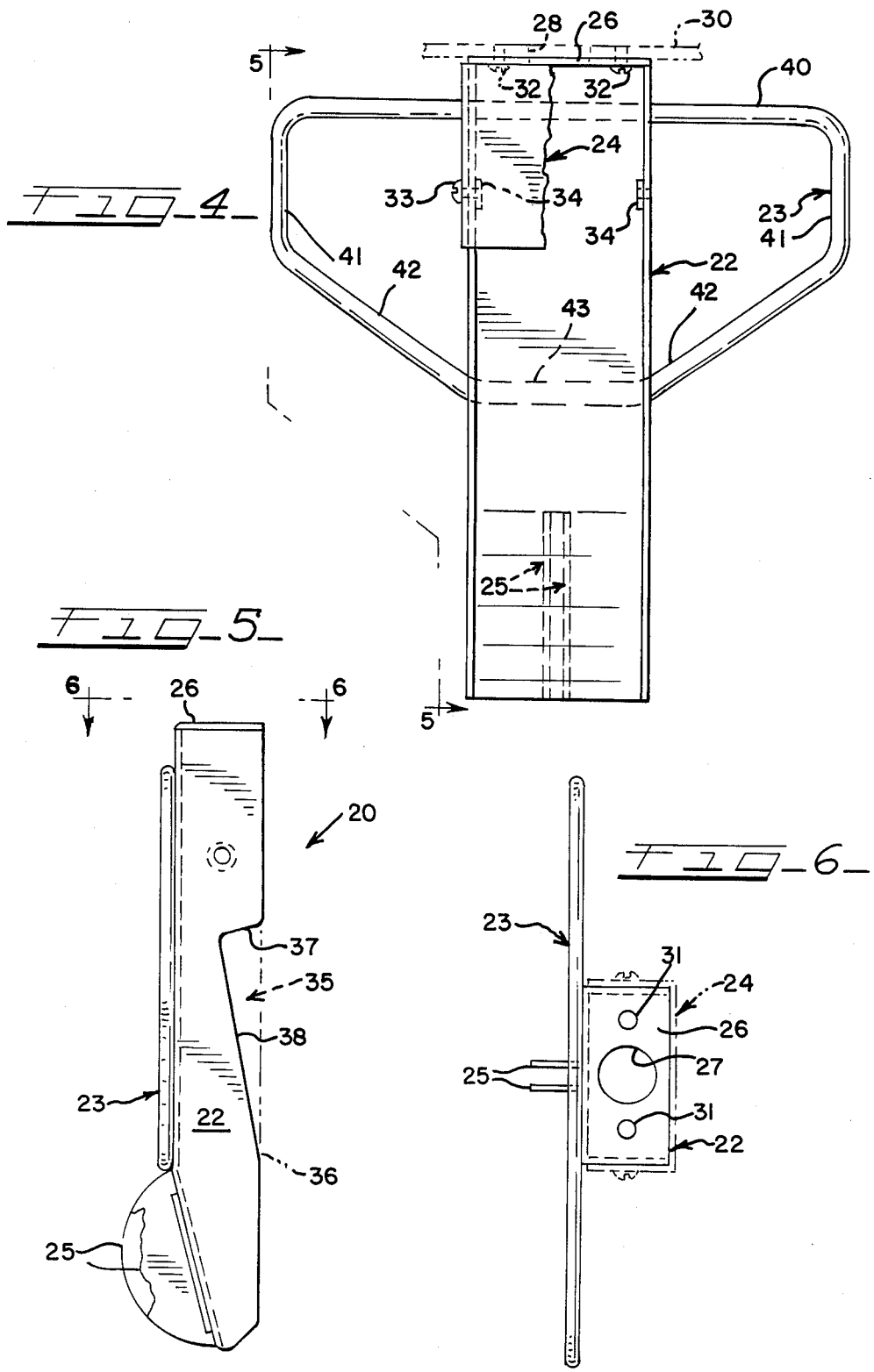

BAG-RECEIVING CHUTE FOR COFFEE GRINDER

SUMMARY OF THE INVENTION

This invention relates generally to a new and improved bag-receiving chute combination for use on a coffee grinder which has a downwardly facing discharge opening from whic different size batches of ground coffee discharge into bags of correspondingly different heights.

The demand for fresh-ground gourmet coffee has increased substantially in recent times and customer operated coffee grinders are now found in self-service supermarkets and other retail outlets. Typically, customers will want to purchase fresh ground coffee in quantities of 1, 2 or 3 pounds. Since customers typically want to select their coffee beans from a variety that may be available, the customer operated grinders will normally hold up to 3 pounds of beans and the customer will permit the entire batch of beans to be ground, leaving the grinder hopper empty and ready to receive the next batch of beans.

A customer-operated coffee grinder should be so designed that a customer can set an appropriately sized bag on the tray underneath the discharge chute and allow it to receive the ground coffee. Nevertheless, it has been found that a significant number of customers hold the bags, particularly, the shorter one-pound size in an elevated position surrounding the discharge chute with the mistaken thought of avoiding possible spillage or loss of the ground coffee as it discharges. However, if a customer places the bag high enough to completely surround and hide the discharge chute, a restriction or blockage may result which prevents the ground coffee from discharging properly or even to back up into the grinder itself.

The object of the invention, generally stated, is the provision of a customer-operated coffee grinder having an elongated bag-receiving chute that will readily accommodate bags of different sizes and heights while using the same base or tray to support each different bag.

An important object of the invention is the provision of a bag-receiving chute combination or structure for a customer-operated coffee grinder which will be trouble-free in operation and prevent improper operation by customers who fail to follow directions for collecting ground coffee as it is discharged from the grinder into bags of different heights and sizes.

A more specific and important object of the invention is the provision of a bag-receiving chute combination for coffee grinders operated by customers who will be grinding different quantities of coffee and collecting the same in bags of correspondingly different heights, and some of whom will try to improperly hold the bags while the ground coffee is being collected.

Still another important object of the invention is a bag-receiving chute combination for a customer operated coffee grinder which prevents customers from interfering with the proper discharge of ground coffee in different size batches into bags of correspondingly different heights, particularly, smaller and shorter bags.

For a more complete understanding of the nature and scope of the invention reference may now be had to the following detailed description of a preferred embodiment thereof taken in connection with the accompanied drawings wherein:

DESCRIPTION OF THE DRAWINGS

FIG. 1 is a front, top, left side perspective view of a coffee grinder equipped with a bag-receiving chute combination embodying the present invention;

FIG. 2 is a front elevation of the coffee grinder shown in FIG. 1;

FIG. 3 is a right side elevation of the coffee grinder shown in FIG. 3;

FIG. 4 is a front elevational view, partly broken away, on enlarged scale of the bag-receiving chute combination shown in FIGS. 1-3;

FIG. 5 is an elevational view taken on line 5—5 of FIG. 4; and

FIG. 6 is a top plan view taken on line 6—6 of FIG. 5.

DETAILED DESCRIPTION

The coffee grinder indicated generally at 5 in FIGS. 1-3 is of known commercial type, the details of which do not form a part of the present invention. Suffice it to point out by way of general description that the grinder 5 has an upper housing 6 in which is located a grinder mechanism 7 driven by electric motor 8. Although the grinder 5 could be set on any suitable flat surface it is preferably set on a tray 10 which has on area that receives and conforms to the rectangular bottom of the grinder 5 and another rectangular area 11 which is adapted to receive bags of different heights and sizes, such as the one indicated at 21 into which ground coffee is to be collected.

The grinder 5 incorporates a manually setable dial and knob combination 13 which the customer-user can manipulate to set the grinder to grind the coffee beans to a selected degree of fineness. The upper front panel of the grinder 5 is also equipped with a master switch 14 and in the lower portion is equipped with a bag actuated switch 12 (FIG. 3) having a bag engaging lever 15 (FIG. 3). Reference may be had to application Ser. No. 752,572 of John D. Zimmerman filed July 8, 1985 and assigned to the assignee of the present invention and application for a detailed description of switch 12 and the circuit in which it is incorporated.

The upper portion of the body of the grinder 5 houses a hopper 19 in which the customer or operator deposits the coffee beans to be ground by lifting a hinged top door 16.

The bag-receiving chute combination with which the preferred embodiment of the present invention is concerned is indicated generally at 20 in the FIG. 1-3 and on enlarged scale in FIGS. 4-6. A typical bag 21 is shown resting on the area 11 and in its open position with its open mouth surrounding the bag-receiving chute combination 20. The bag 21 represents a 3-pound size bag and it will be understood that 1 and 2 pound bags will be shorter and smaller. Thus, a 2-pound bag will extend up to a top level indicated by the line L2 in FIG. 3 while a 1 pound bag will extend up to line L1.

The bag-receiving chute combination 20 is made up of three main parts the details of which are shown in FIGS. 4-6. One part is the downwardly extending, elongated channel-shaped chute indicated generally at 22 in FIGS. 4-6. Another part is a bag mouth spreader indicated at generally at 23 and the third part is U-shaped cover indicated generally at 24 in FIGS. 4-6.

The chute 22 is, generally, channel-shaped and is sufficiently elongated to accommodate (i.e. extend into) the bags of different heights. The lower end of the chute 22 is inclined outwardly and carries on the rear side a pair of spaced ears 25—25 into and between which the lever 15 of the bag actuated switch swings when a bag is not present. The upper end of the chute 22 has a plate 26 extending across the top and which may be integrally formed as part of the chute. This plate 26 is provided with an opening 27 sized and positioned to mate with a discharge opening 28 in a plate indicated in broken line 30 which forms part of the body of the grinder 5. The plate 26 is also equipped with a pair of screw-accommodating holes 31—31 by which a pair of screws 32—32 may be used to attach the chute 22 to the grinder 5 where the plate 30 overhangs the bag receiving area 11 of the tray 10.

The upper end of the chute 22 is enclosed by the U-shaped cover 24 the sides of which fit over the upper end of the chute 22 and are secured in place by screws 33 which screw into weld nuts 34—34 on the inner sides of the chute 22.

The opposing sides of the chute 22 are cut away or removed below the U-shaped cover 24 in the triangular area indicated at 35 in FIG. 5, the apex of the triangle being at the bottom as indicated at 36 and the base indicated at 37 at the top with one of the sides indicated at 38.

An important feature of the invention in its preferred form is the bag mouth spreader 23 which takes the form of a piece of wire suitably shaped so as to have an upper horizontal section 40 which may be spot welded to the rear side of the chute 22 and which extends outwardly on opposite sides of the chute 22 a distance approximately equal to the width of the chute. Vertical or upright legs 41—41 extend downwardly from the outer ends of the section 40 and join inwardly and downwardly inclined sections 42—42 to approximately the opposite sides of the chute 22. The lower ends of the sections 42 are joined by a bottom horizontal portion or section 43 which is spot welded or otherwise secured to the backside of the chute 22.

The general operation of the grinder 5 will now be described with the functioning of the bag-receiving chute combination 20 being described in detail.

Typically, a customer will purchase the desired quantity of the desired coffee beans from the selection provided and have the beans weighed in a bag of appropriate size. The customer will then go to a grinder 5 that is not in use and empty the purchased beans into the hopper by raising the hinged door 16. The customer will now insert the bag 21 so that the mouth comes up back of the discharge chute 22 and then sets the bag down on the area 11. When the mouth of the bag is brought up behind the chute 22 and the front of the grinder body it automatically cams or forces the operating lever 15 of the bag switch out from between the ears 25 and thereby actuates switch 12 to its "on" position. The customer now presses the "on/off/start" switch to "start" thereby energizing the motor 8. After starting, the switch bottom can be released and it will assume its "on" position. The ground coffee will discharge from the grinder through the openings 28 and 27 into the upper end of the bag-receiving discharge chute assembly or combination 20. Prior to inserting the bag 21 the customer will have set the dial 13 to the appropriate degree of grind fineness desired.

The ground coffee will flow downwardly through the chute 22 between opposite sides thereof and into the bag 21. As the bag 21 begins to fill with the ground coffee there is a tendency for some customers to lift the bag and collapse the mouth around the discharge chute assembly 20, with the object of preventing spillage or escape of the ground coffee from the bag. However, as the bag mouth is raised it encounters the spreader form 23 which spreads the mouth of the bag and keeps the mouth of the bag open so that it cannot be collapsed and grasped tightly around the discharged chute assembly. If a large enough bag has been selected for the quality of beans being ground there is no need for the customer to touch the bag after inserting it in place on the grinder as shown in FIGS. 1-3, until the grinding has been completed. Then the bag can be removed without spilling any of the contents and properly folded and sealed as by pressure sensitive tape or by dead wire fold retainers.

While the wire form 23 serves to spread out laterally the mouth of a bag if it is raised up by a customer, the cut away triangular areas 35 in the sides of the chute 22 below the U-shaped cover 24 serve as reliefs to allow ground coffee to flow out on opposite sides of the chute.

It will be appreciated to those skilled in the art that changes in details in the particular bag-receiving chute combination described and shown may be made without departing from the spirit and scope of the following claims. For example, the wire form bag mouth spreader 23 could be replaced by said wings extending from opposite sides of the chute. Even when the spreader 23 is omitted, the invention will be useful and offer advantages.

What is claimed is:

1. A bag-receiving discharge chute combination for a coffee grinder having a downwardly facing discharge opening from which different sized batches of ground coffee are discharged into bags of correspondingly different heights, comprising, a substantially vertical downwardly extending elongated, channel-shaped chute body adapted to be attached at its upper end to an overhanging portion of the coffee grinder so that ground coffee discharges into the upper end of the chute, the open side of said chute faces away from the grinder, and the back side of said chute is spaced from the grinder; and, a bag mouth spreader mounted on said chute body so as to prevent a bag mouth from being held with respect to said chute body so as to prevent free discharge of ground coffee therefrom.

2. The bag-receiving discharge chute combination of claim 1 wherein said chute body has a plate extending transversely across its upper end by means of which it may be secured to the underside of the portion of the grinder having a discharge opening therein, and said plate has an opening therein which mates with said grinder discharge opening.

3. The bag-receiving discharge chute combination of claim 1 having a U-shaped cover member which is secured over the upper end of said chute body so as to enclose the upper end of said chute body.

4. The bag-receiving discharge chute combination of claim 1 wherein said bag mouth spreader is a wire form.

5. The bag-receiving discharge chute combination of claim 4 wherein said wire form is secured to the back side of said chute body.

6. A bag-receiving discharge chute combination for a coffee grinder having a downwardly facing discharge opening from which different sized batches of ground coffee are discharged into bags of correspondingly different heights, comprising, a downwardly extending elongated, channel-shaped chute body adapted to be attached at its upper end to an overhanging portion of the coffee grinder so that ground coffee discharges into the upper end of the chute, the open side of said chute faces away from the grinder, and the back side of said chute is spaced from the grinder;

a bag mouth spreader mounted on said chute body so as to prevent a bag mouth from being held with respect to said chute body so as to prevent free discharge of ground coffee therefrom and, said bag mouth spreader being a wire form secured to the back side of said chute body and wherein said wire form has a horizontal upper section which is secured to the rear of said chute body adjacent the upper end thereof and extends outwardly from opposite sides thereof, a pair of generally vertical sections depending from the opposite ends of said horizontal upper section, a pair of inclined sections extending inwardly and downwardly from the lower ends of said vertical sections, and a horizontal lower section secured to the rear side of said chute body and interconnecting the lower ends of said inwardly inclined sections.

7. The bag-receiving discharge chute combination of claim 6 wherein said wire form is integrally formed from a length of wire.

8. A bag-receiving discharge chute combination for a coffee grinder having a downwardly facing discharge opening from which different sized batches of ground coffee are discharged into bags of correspondingly different heights, comprising, a downwardly extending elongated, channel-shaped chute body adapted to be attached at its upper end to an overhanging portion of the coffee grinder so that ground coffee discharges into the upper end of the chute, the open side of said chute faces away from the grinder, and the back side of said chute is spaced from the grinder;

a bag mouth spreader mounted on said chute body so as to prevent a bag mouth from being held with respect to said chute body so as to prevent free discharge of ground coffee therefrom and, a U-shaped cover member secured over the upper end of said chute body so as to enclose the upper end of said chute body;

the sides of said chute body being cut away underneath said U-shaped cover member so as to allow a portion of the ground coffee discharging into the upper end of said chute body to escape from the opposite sides of said chute.

* * * * *